US012790982B2

(12) United States Patent
Hwang

(10) Patent No.: US 12,790,982 B2
(45) Date of Patent: Nov. 10, 2026

(54) GAS TURBINE SYSTEM

(71) Applicant: DOOSAN ENERBILITY CO., LTD., Changwon (KR)

(72) Inventor: Kyusic Hwang, Changwon (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 0 days.

(21) Appl. No.: 19/186,619

(22) Filed: Apr. 23, 2025

(65) Prior Publication Data

US 2026/0009360 A1 Jan. 8, 2026

(30) Foreign Application Priority Data

Jul. 2, 2024 (KR) ........................ 10-2024-0086980

(51) Int. Cl.
*F02C 7/224* (2006.01)

(52) U.S. Cl.
CPC ........ *F02C 7/224* (2013.01); *F05D 2260/213* (2013.01)

(58) Field of Classification Search
CPC .... F02C 7/224; F02C 1/06; F02C 6/18; F02C 1/005; F02C 1/08; F02C 1/10; F02C 3/34; F02M 26/19; F05D 2220/32; F05D 2220/60
See application file for complete search history.

(56) References Cited

U.S. PATENT DOCUMENTS

| | | | | |
|---|---|---|---|---|
| 3,949,548 | A * | 4/1976 | Lockwood, Jr. | F02C 3/34 60/39.15 |
| 4,204,401 | A * | 5/1980 | Earnest | F02C 3/34 60/773 |
| 4,932,204 | A | 6/1990 | Pavel | |
| 5,845,481 | A | 12/1998 | Briesch | |
| 6,363,709 | B2 * | 4/2002 | Kataoka | F02C 9/18 60/39.52 |
| 6,381,945 | B2 * | 5/2002 | Werner | F02C 7/224 415/114 |

(Continued)

FOREIGN PATENT DOCUMENTS

| | | | | |
|---|---|---|---|---|
| CA | 2276696 A1 | | 7/1998 | |
| DE | 102023213048 A1 | * | 6/2025 | H01M 8/0687 |

(Continued)

OTHER PUBLICATIONS

European Search Report dated Sep. 25, 2025 issued for European patent application (Appl. No. 25170857.4).

(Continued)

*Primary Examiner* — Craig Kim
(74) *Attorney, Agent, or Firm* — Harvest IP Law, LLP

(57) ABSTRACT

Disclosed is a gas turbine system. The gas turbine system includes an exhaust gas guide duct provided on a downstream side of a gas turbine, and configured to guide exhaust gas discharged from the gas turbine to an outside, a recirculation line connected to the exhaust gas guide duct, and configured to circulate the exhaust gas extracted from the exhaust gas guide duct back into the exhaust gas guide duct, a fuel supply line configured to supply a fuel to a combustor of the gas turbine, and a heat exchanger configured to heat the fuel by using the exhaust gas recirculating along the circulation line.

15 Claims, 3 Drawing Sheets

(56) References Cited

U.S. PATENT DOCUMENTS

| | | | | |
|---|---|---|---|---|
| 7,509,794 | B2 * | 3/2009 | Bruckner | F22B 1/1815 122/7 B |
| 7,565,792 | B2 * | 7/2009 | Tanaka | F02C 7/185 60/39.281 |
| 8,220,268 | B2 * | 7/2012 | Callas | F02C 3/22 60/39.511 |
| 8,984,893 | B2 * | 3/2015 | Schroder | F02C 6/16 60/772 |
| 8,991,149 | B2 * | 3/2015 | Anand | F02C 6/18 60/299 |
| 9,347,375 | B2 * | 5/2016 | Hughes | F23R 3/04 |
| 9,470,145 | B2 * | 10/2016 | Ball, Jr. | F02C 7/224 |
| 9,708,977 | B2 * | 7/2017 | Woodall | F02C 3/14 |
| 9,885,290 | B2 * | 2/2018 | Della-Fera | F02C 3/34 |
| 9,903,276 | B2 * | 2/2018 | Hotta | F02C 7/224 |
| 12,240,624 | B1 * | 3/2025 | Miller | B64D 37/34 |
| 2008/0309087 | A1 * | 12/2008 | Evulet | F02C 7/10 60/645 |
| 2009/0284013 | A1 * | 11/2009 | Anand | F02C 3/34 60/39.83 |
| 2010/0101543 | A1 * | 4/2010 | Garcia-Crespo | F02C 7/10 123/543 |
| 2010/0101545 | A1 * | 4/2010 | Draper | F02C 7/05 60/605.2 |
| 2010/0319359 | A1 * | 12/2010 | Holt | F02C 6/08 60/782 |
| 2011/0048002 | A1 * | 3/2011 | Taylor | F02C 3/34 60/320 |
| 2013/0098038 | A1 | 4/2013 | Bilton | |
| 2013/0269310 | A1 * | 10/2013 | Wichmann | F02C 3/34 60/726 |
| 2013/0269355 | A1 * | 10/2013 | Wichmann | F02C 6/18 60/726 |
| 2013/0283808 | A1 * | 10/2013 | Kolvick | F02C 7/18 60/39.52 |
| 2013/0333673 | A1 * | 12/2013 | Frick | F02M 31/04 123/557 |
| 2013/0340404 | A1 * | 12/2013 | Hughes | F02C 7/08 60/39.52 |
| 2014/0102071 | A1 * | 4/2014 | Ball, Jr. | F02C 7/224 60/39.5 |
| 2014/0102105 | A1 | 4/2014 | Janapaneedi | |
| 2014/0102113 | A1 * | 4/2014 | Cuevas | F02C 7/047 60/39.093 |
| 2014/0305127 | A1 * | 10/2014 | Schroder | F02C 6/16 60/727 |
| 2014/0360154 | A1 * | 12/2014 | Benz | F02C 3/34 60/39.52 |
| 2016/0177881 | A1 * | 6/2016 | Wicks | F02M 26/28 123/568.12 |
| 2016/0186658 | A1 * | 6/2016 | Vorel | F02C 9/40 60/39.52 |
| 2018/0156118 | A1 * | 6/2018 | Lighty | F02C 7/14 |
| 2020/0158019 | A1 * | 5/2020 | Kawai | F02C 7/18 |
| 2021/0139160 | A1 * | 5/2021 | Kool | F02C 7/224 |
| 2022/0243660 | A1 * | 8/2022 | Rambo | F02C 7/224 |
| 2023/0258124 | A1 * | 8/2023 | Uechi | F01K 17/06 60/39.52 |
| 2024/0418121 | A1 * | 12/2024 | Smith | F02C 3/22 |
| 2025/0243807 | A1 * | 7/2025 | Roshan | F02C 6/18 |
| 2026/0218654 | A1 * | 7/2026 | Dhinesh | B01D 53/0462 |

FOREIGN PATENT DOCUMENTS

| | | | | | |
|---|---|---|---|---|---|
| EP | 2650505 | A2 | * | 10/2013 | F02C 3/34 |
| FR | 2735192 | A1 | * | 12/1996 | F16C 11/0661 |
| JP | 2013-040619 | A | | 2/2013 | |
| JP | 5675385 | B2 | | 2/2015 | |
| JP | 2016527429 | A | * | 9/2016 | F02C 3/34 |
| JP | 2016192281 | A | * | 11/2016 | |
| JP | 6266292 | B2 | | 1/2018 | |
| KR | 10-2023-0104733 | A | | 7/2023 | |
| WO | WO-9703281 | A1 | * | 1/1997 | F28F 3/005 |
| WO | WO-2013163045 | A1 | * | 10/2013 | F02C 7/185 |
| WO | WO-2015112317 | A1 | * | 7/2015 | F02C 9/48 |

OTHER PUBLICATIONS

Office Action From Korean Patent Office Dated Dec. 12, 2025 Issued for Korean Patent Application No. 10-2024-0086980.

* cited by examiner

GAS TURBINE SYSTEM

CROSS-REFERENCE TO RELATED APPLICATION

This application claims the benefit of priority to Korean Patent Application No. 10-2024-0086980, filed in the Korean Intellectual Property Office on Jul. 2, 2024, the entire contents of which are incorporated herein by reference.

TECHNICAL FIELD

The present disclosure relates to a gas turbine system, and more particularly, to a gas turbine system that may improve combustion characteristics of a fuel and may improve an output and a performance.

BACKGROUND

A gas turbine is configured to mix compressed air that is compressed in a compressor and a fuel and burn it in a combustor, and rotate a turbine with a high-temperature gas generated through combustion.

On the other hand, when a temperature of the fuel supplied to the combustor is lower than a certain level, the combustion characteristics of the fuel may deteriorate, and thus, a temperature of the fuel supplied to the compressor has to be maintained at an appropriate temperature condition.

Accordingly, conventionally, a method of extracting air of a high temperature and a high pressure at a rear end (a downstream side) of a compressor to heat a fuel supplied to the compressor has been suggested. However, when air is extracted on a downstream side of the compressor, an efficiency and an output of a gas turbine decrease, and vibration may occur in a combustor due to a decrease in an amount of the air supplied to the combustor.

Furthermore, a method of heating a fuel supplied to a compressor by using a separate heating device, such as a heat recovery steam generator (HRSG), boiler, or heater. However, conventionally, as a separate heating device has to be additionally provided, costs increase and an operation condition of the heating device has to be created before a start of a gas turbine, and thus, an operation of a power plant becomes complex.

Accordingly, in recent years, various studies for improving an output and a performance of a turbine while improving combustion characteristics of a fuel have been made, but the studies are incomplete, and thus, a development thereof is required.

SUMMARY

The present disclosure has been made to solve the above-mentioned problems occurring in the prior art while advantages achieved by the prior art are maintained intact.

An aspect of the present disclosure provides a gas turbine system that may improve combustion characteristics of a fuel and improve an output and a performance.

In particular, an embodiment of the present disclosure aims to heat a fuel supplied to a combustor to an appropriate temperature that is suitable for combustion by using exhaust gas exhausted in a gas turbine while not extracting air of a high temperature and a high pressure at a rear end of a compressor or not using a separate heating device.

Most of all, an embodiment of the present disclosure aims to lower a temperature of exhaust gas while improving combustion characteristics of a fuel by using the exhaust gas exhausted from a gas turbine.

In addition, an embodiment of the present disclosure aims to simplify a structure and improve a degree of freedom of design and a space utility.

Furthermore, an embodiment of the present disclosure aims to save costs and improve a stability and a reliability.

The technical problems to be solved by the present disclosure are not limited to the aforementioned problems, and any other technical problems not mentioned herein will be clearly understood from the following description by those skilled in the art to which the present disclosure pertains.

According to a preferred embodiment of the present disclosure for achieving the above-described objects of the present disclosure, a gas turbine system includes an exhaust gas guide duct provided on a downstream side of a gas turbine, and that guides exhaust gas discharged from the gas turbine to an outside, a recirculation line connected to the exhaust gas guide duct, and that recirculates the exhaust gas extracted from the exhaust gas guide duct back into the exhaust gas guide duct, a fuel supply line that supplies a fuel to a combustor of the gas turbine, and a heat exchanger that heats the fuel using the exhaust gas recirculating along the recirculation line.

This is to improve the combustion characteristics of the fuel supplied to the combustor of the gas turbine and improve an output and a performance.

That is, when the temperature of the fuel supplied to the combustor is lower by a specific level or more, the combustion characteristics of the fuel may be lowered. Therefore, the temperature of the fuel supplied to the compressor needs to be maintained in appropriate an temperature condition. Conventionally, the fuel supplied to the compressor by extracting the air of the high temperature and the high pressure at a rear end (a downstream side) of the compressor has to be heated, or the fuel supplied to the compressor has to be heated by using a separate heating device (e.g., a heat recovery steam generator (HRSG), a boiler, or a heater). In such conventional system, the efficiency and the output of the gas turbine decrease, vibration occurs in the combustor due to an decrease in the amount of the air supplied to the combustor, and an operation of a power plant becomes complex and costs increase.

However, in an embodiment of the present disclosure, by heating the fuel supplied to the combustor by using the exhaust gas that recirculates to the exhaust gas guide duct along the circulation line, the combustion characteristics of the fuel may be improved, and the output and the performance of the gas turbine may be improved.

Most of all, in an embodiment of the present disclosure, by heating the fuel supplied to the combustor by using waste heat of the exhaust gas that recirculates to the exhaust gas guide duct along the recirculation line while not extracting the air of the high temperature and the high pressure at a rear end of the compressor or not using a separate heating device, the combustion characteristics of the fuel may be improved while not decreasing the efficiency and output of the gas turbine or not using a separate fuel.

According to a preferred embodiment of the present disclosure, an inlet end of the recirculation line may be connected to the exhaust gas guide duct, and an outlet end of the recirculation line may be connected to the exhaust gas guide duct on an upstream side of the inlet end.

According to a preferred embodiment of the present disclosure, the gas turbine system may include an exhaust gas processing part that is provided on an upstream side of the exhaust gas guide duct to process the exhaust gas, and the recirculation line may be connected to the exhaust gas guide duct on a downstream side of the exhaust gas processing part.

The heat exchanger may be provided in various structures that may heat the fuel supplied to the combustor along the fuel supply line by a medium of the exhaust gas that circulates along the circulation line.

According to a preferred embodiment of the present disclosure, the heat exchanger may be configured to heat the fuel by an intermediate medium of the exterior air heated by the exhaust gas.

According to a preferred embodiment of the present disclosure, the heat exchanger may include a housing member that is configured such that the exterior enters and exits, a first heat exchange part that is provided in the housing member, through which the recirculation line passes, and configured to heat the exterior air introduced into the housing member by heat exchange with the exhaust gas that recirculates along the circulation line, and a second heat exchange part that is provided in the housing member and upside the first heat exchange part, through which the fuel supply line passes, and configured to heat the fuel supplied along the fuel supply line by heat exchange with the exterior air that passes through the first heat exchange part.

According to a preferred embodiment of the present disclosure, the gas turbine system may include a mixing chamber that is provided between the first heat exchange part and the second heat exchange part and mixes the exterior air that has passed through the first heat exchange part, and the second heat exchange part may heat the fuel using the exterior air that has passed via the mixing chamber.

In this way, in an embodiment of the present disclosure, because a heat exchange deviation between the second heat exchange part and an exterior air may be minimized by providing the mixing chamber between the first heat exchange part and the second heat exchange part and mixing the high-temperature exterior air that has passed via the first heat exchange part such that the exterior air has a uniform temperature and a uniform flow velocity in the mixing chamber before the exterior air is exposed to (heat-exchanged with) the second heat exchange part, the fuel that has passed via the second heat exchange part may be heated at a more uniform temperature.

According to a preferred embodiment of the present disclosure, the exhaust gas that recirculates to the exhaust gas guide duct via the first heat exchange part may be defined as having a lower temperature than that of the exhaust gas introduced from the exhaust gas guide duct to the recirculation line.

According to a preferred embodiment of the present disclosure, the exhaust gas that has passed via the first heat exchange part may be defined as having a temperature of 200° C. to 250° C.

In this way, in an embodiment of the present disclosure, because the temperature of the exhaust gas discharged to the outside through the exhaust gas guide duct may be lowered further by recirculating the cooled exhaust gas to the exhaust gas guide duct via the first heat exchange part again, the exhaust gas system and the environment facility may be managed more efficiently.

According to a preferred embodiment of the present disclosure, the exterior air that has passed via the first heat exchange part may be defined as having a temperature of 250° C. to 400° C.

According to a preferred embodiment of the present disclosure, the fuel that has passed via the first heat exchange part may be defined as having a temperature of 200° C. to 350° C.

According to a preferred embodiment of the present disclosure, the gas turbine system may include a first control valve that is provided in the recirculation line and controls flow of the exhaust gas that flows from the exhaust gas guide duct to the heat exchanger.

According to a preferred embodiment of the present disclosure, the gas turbine system may include a second control valve that is provided in the recirculation line and controls flow of the exhaust gas that flows from the heat exchanger to the exhaust gas guide duct.

According to a preferred embodiment of the present disclosure, the gas turbine system may include an ejection nozzle connected to an outlet end, and that ejects the exhaust gas to an interior of the exhaust gas guide duct.

In this way, in an embodiment of the present disclosure, the high-temperature exhaust gas and the low-temperature exhaust gas (the exhaust gas cooled via the first heat exchange part) may be mixed more uniformly by providing the ejection nozzle at the outlet end of the recirculation line and ejecting the exhaust gas (the cooled exhaust gas) that has passed via the first heat exchange part into an interior of the exhaust gas guide duct.

The fuel supply line may be provided in various structures that may supply the fuel to the combustor of the gas turbine.

According to a preferred embodiment of the present disclosure, the fuel supply line may include a first supply line that is connected to the combustor, and a second supply line, which branches from the first supply line, extends through the heat exchanger, then merges back to the first supply line.

According to a preferred embodiment of the present disclosure, the gas turbine system may include a third control valve that is provided in the first supply line at a position where the second supply line branches and the third control valve may switch flow of the fuel such that at least a portion of the fuel selectively passes via the second supply line.

According to a preferred embodiment of the present disclosure, the gas turbine system may include an orifice that is provided in the first supply line at a portion bypassing the heat exchanger and adjusts the flow rate of the fuel that flows along the first supply line.

According to a preferred embodiment of the present disclosure, the gas turbine system includes a gas turbine including a combustor that burns a fuel together with air to generate gas, a fuel supply line that supplies the fuel to the combustor, an exhaust gas guide duct provided on a downstream side of the gas turbine, and that guides exhaust gas discharged from the gas turbine to an outside, a recirculation line connected to the exhaust gas guide duct, and that circulates the exhaust gas extracted from the exhaust gas guide duct to the exhaust gas guide duct again, and a heat exchanger that heats the fuel by a medium of the exhaust gas circulating along the circulation line.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

However, the technical spirit of the present disclosure is not limited to specific embodiments described herein, and may be implemented in various different forms, and one or more of the components of the embodiments may be selectively coupled to each other or replaced with each other to be used without departing from the technical spirit of the present disclosure.

Furthermore, the (including terms technical and scientific terms) used in the embodiments of the present disclosure may be construed as meanings that may be generally understood to those skilled in the art, to which the present disclosure pertains, unless particularly defined and described clearly.

Furthermore, the terms used in the embodiments of the present disclosure are provided to describe embodiments, not intended to limit the present disclosure.

In the specification, a singular form may include a plural form unless particularly mentioned in the context, and an expression "at least one (one or more) of A, B, and C" may include one or more of all combinations of A, B, and C.

In describing components of the embodiments of the present disclosure, the terms first, second, A, B, (a), (b), and the like may be used herein.

These terms are only used to distinguish one component from another component, but do not limit the corresponding components irrespective of the nature, order, or priority of the corresponding components.

Furthermore, when it is described that a component is 'connected to", 'coupled to', or 'electrically connected to" a second component, the component may not only be directly connected to, coupled to, or electrically connected to the second component, but also be 'connected to', 'coupled to', or 'electrically connected to' the second component due to a third component therebetween.

Furthermore, when it is described that a component is formed or disposed "on an upper side of (above) or on a lower side of (under)" a second component, the two components may not only directly contact each other but also a third component may be formed or disposed between the two components. Furthermore, the expression "on an upper side of (above) or on a lower side of (under)" may mean not only an upward direction but also a downward direction with respect to one component.

Figure 1:
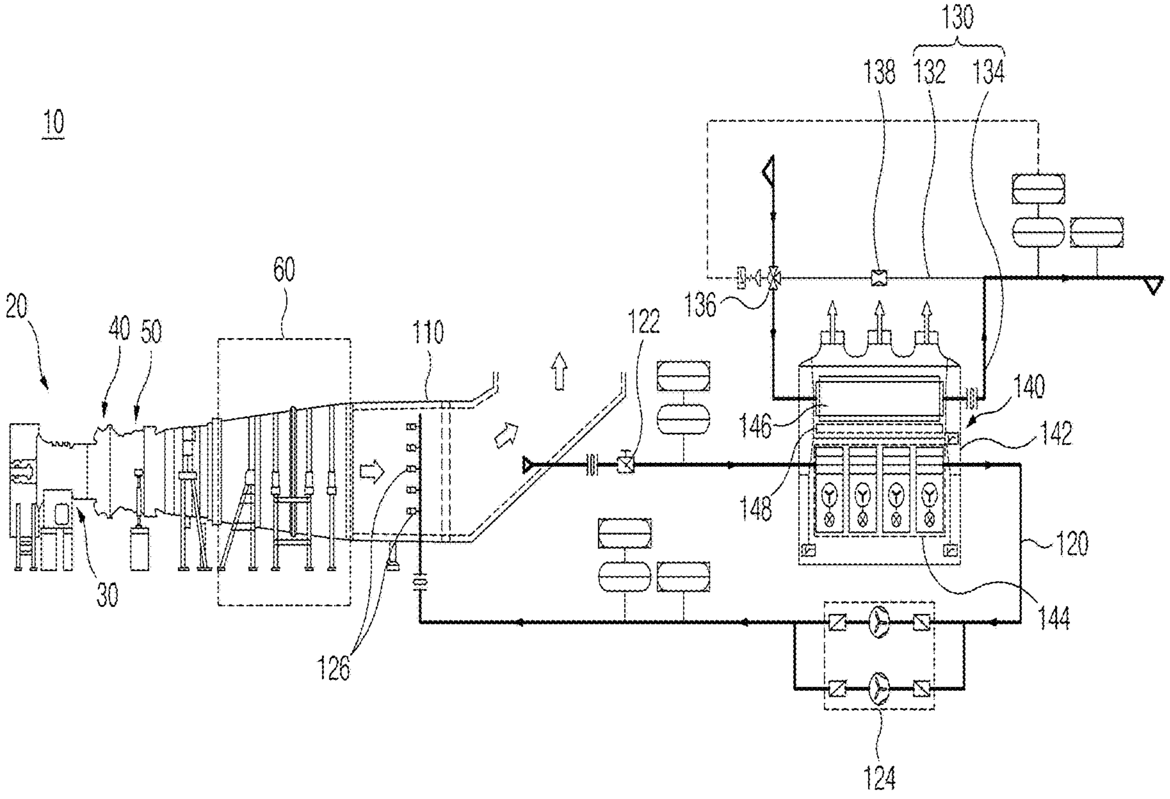
FIG. 1 is a view illustrating a gas turbine system according to the present disclosure.
Figure 2:
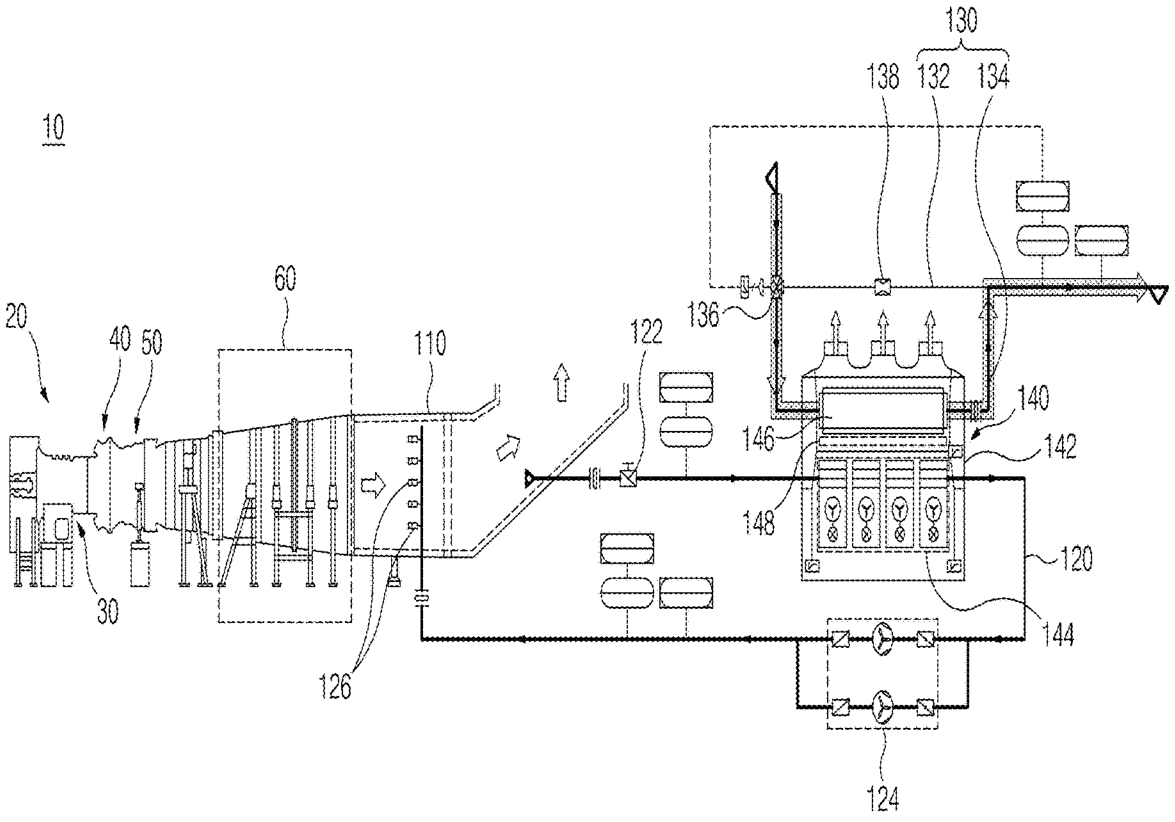
FIG. 2 illustrates a gas turbine system according to the present disclosure, and is a view illustrating flow of a fuel.
Figure 3:
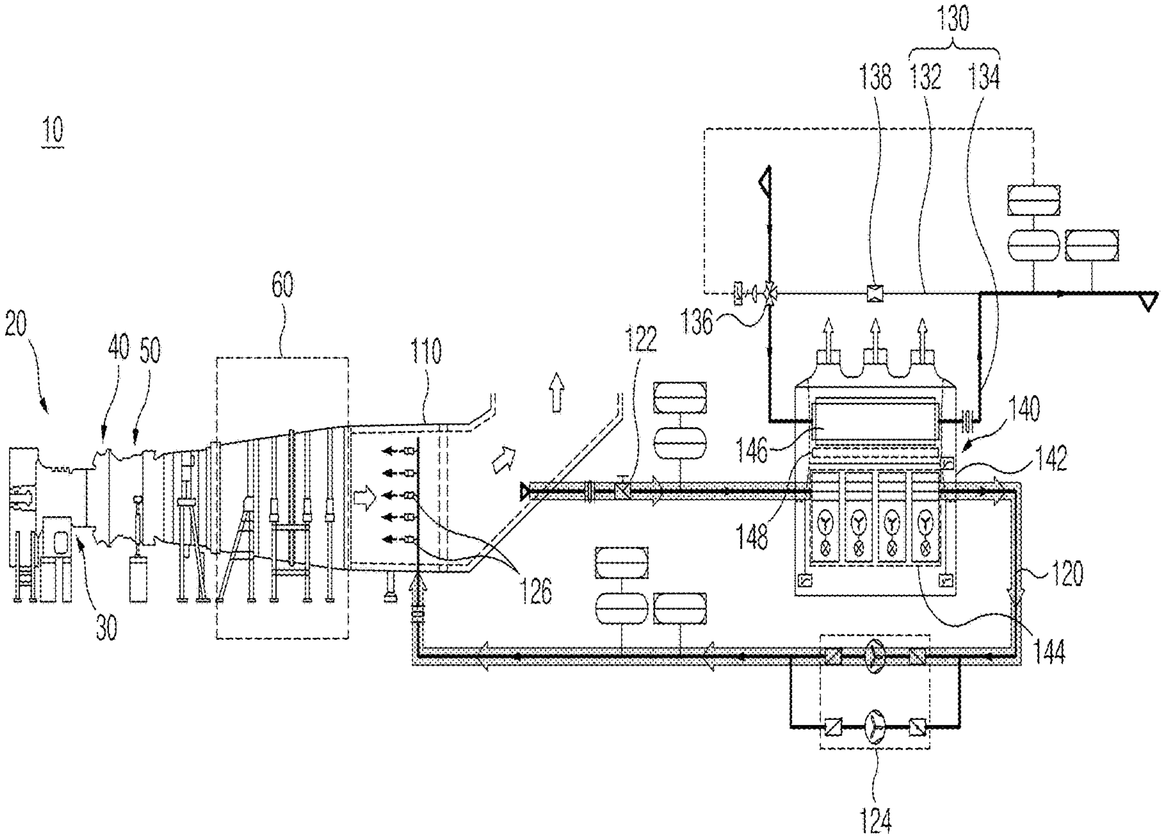
FIG. 3 illustrates a gas turbine system according to the present disclosure, and is a view illustrating flow of exhaust gas.

Referring to FIGS. 1 to 3, a gas turbine system according to an embodiment of the present disclosure includes an exhaust gas guide duct 110 that is provided on a downstream side of a gas turbine 20, and configured to guide exhaust gas discharged from the gas turbine 20 to an outside, a recirculation line 120 that is connected to the exhaust gas guide duct 110, and recirculating the exhaust gas that is extracted from the exhaust gas guide duct 110 to the exhaust gas guide duct 110 again, a fuel supply line 130 that supplies a fuel to a combustor 40 of the gas turbine 20, and a heat exchanger 140 that heats the fuel by a medium of the exhaust gas that is being recirculated along the recirculation line 120.

For reference, the gas turbine 20 is configured to, after suctioning air in the atmosphere and compressing the air at a high pressure, burn a fuel in a static pressure environment to emit thermal energy, and, after expanding this high-temperature combustion gas to convert it into kinetic energy, emit exhaust gas containing residual energy into the atmosphere.

More specifically, the gas turbine 20 includes a compressor 30, a combustor 40, and a turbine 50.

The compressor 30 of the gas turbine 20 is configured to suction air from the outside and compress the air.

As an example, the compressor 30 may supply cooling air to a high-temperature area of the gas turbine 20, which requires cooling, while also supplying compressed air that is compressed by blades (not illustrated) of the compressor 30 to the combustor 40.

Various compressors 30 may be used as the compressor 30 according to required conditions and design specifications, and the present disclosure is neither limited nor restricted by the type and structure of the compressor 30.

As an example, the compressor 30 may be designed as a centrifugal compressor or an axial compressor, and a centrifugal compressor may be used in a small-sized gas turbine and a multi-stage axial compressor may be used in a large-sized gas turbine.

The combustor 40 is configured to generate high-energy combustion gas by mixing the compressed air supplied from the compressor 30 with the fuel and through isobaric combustion.

Various combustors 40 that may mix and burn the compressed air and the fuel may be used as the combustor 40, and the present disclosure is neither limited nor restricted by the type and structure of the combustor 40.

The high-temperature, high-pressure combustion gas generated in the combustor 40 is supplied to the turbine 50. In the turbine 50, the thermal energy of the exhaust gas may be converted into mechanical energy by adiabatically expanding the combustion gas and applying a collision and reaction force to a plurality of blades radially disposed on a rotary shaft of the turbine 50, thereby rotating the rotary shaft.

A portion of the mechanical energy generated in the turbine 50 may be utilized as energy that is necessary to compress the air in the compressor 30, and the remaining portions thereof may be utilized as effective energy, for example, to driving a power generator to produce electric power.

The exhaust gas guide duct 110 is configured to guide the exhaust gas (e.g., the exhaust gas of approximately 600° C.) that is discharged from the gas turbine 20.

The exhaust gas guide duct 110 may be provided in various structures that may discharge the exhaust gas discharged from the gas turbine 20 to the outside, and the present disclosure is neither limited nor restricted by the structure and form of the exhaust gas guide duct 110.

The recirculation line 120 is connected to the exhaust gas guide duct 110, and is configured to recirculate the exhaust gas extracted from the exhaust gas guide duct 110 back into the same exhaust gas guide duct 110.

That is, after a portion of the exhaust gas that flows along the exhaust gas guide duct 110 is extracted from the exhaust gas guide duct 110, it may circulate to the exhaust gas guide duct 110 through and along the recirculation line 120 again.

The recirculation line 120 may be provided in various structures that may recirculate the exhaust gas that flows along the exhaust gas guide duct 110, and the present disclosure is neither limited nor restricted by the structure and form of the recirculation line 120.

Hereinafter, an example of the recirculation line 120 having a substantially rectangular loop form will be described. According to another embodiment of the present disclosure, the recirculation line 120 may be configured to form a curved loop form or other forms.

According to a preferred embodiment of the present disclosure, an inlet end of the recirculation line 120 may be connected to the exhaust gas guide duct 110, and an outlet end of the recirculation line 120 may be connected to the exhaust gas guide duct 110 on an upstream side of the inlet end. According to another embodiment of the present disclosure, the outlet end of the recirculation line may be configured to be connected to the exhaust gas guide duct on a downstream side of the recirculation line of the inlet end.

According to a preferred embodiment of the present disclosure, the gas turbine system may include an exhaust gas processing part 60 that is provided on an upstream side of the exhaust gas guide duct 110 to process (i.e., purify) the exhaust gas, and the recirculation line 120 may be connected to the exhaust gas guide duct 110 on a downstream side of the exhaust gas processing part 60.

In the above-described and illustrated embodiment of the present disclosure, an example of the recirculation line 120 being connected to the exhaust gas guide duct 110 on a downstream side of the exhaust gas processing part 60 is described, but according to another embodiment of the present disclosure, the recirculation line 120 may be connected to the exhaust gas guide duct on an upstream side of the exhaust gas processing part.

The fuel supply line 130 is configured to selectively supply the fuel to the combustor 40 of the gas turbine 20.

The fuel supply line 130 may be provided in various structures that may supply a fuel to the combustor 40 of the gas turbine 20, and the present disclosure is neither limited nor restricted by the structure and form of the fuel supply line 130.

Common kerosene or a mixture of kerosene and gasoline may be used as the fuel supplied to the combustor 40 along the fuel supply line 130, and the present disclosure is neither limited nor limited by the type and characteristics of the fuel.

The heat exchanger 140 is configured to heat the fuel to be supplied to the combustor 40 via the fuel supply line 130, using the exhaust gas that recirculates along the recirculation line 120 as the heat transfer medium.

This is due to the fact that the combustion characteristics of the fuel degrade when a temperature of the fuel supplied to the combustor 40 falls below a certain level. In an embodiment of the present disclosure, the combustion characteristics of the fuel may be ensured and an efficiency and an output of the gas turbine 20 may be improved by heating the fuel to be supplied to the combustor 40, by heating the fuel to an appropriate temperature using the exhaust gas recirculating along the fuel supply line 130 as heating medium.

The heat exchanger 140 may be provided in various structures that may heat the fuel supplied to the combustor 40 along the fuel supply line 130 by a medium of the exhaust gas that recirculates along the recirculation line 120, and the present disclosure is neither limited nor restricted by the type and structure of the heat exchanger 140.

According to a preferred embodiment of the present disclosure, the heat exchanger 140 may be configured to heat the fuel using exterior air that is heated by the recirculating exhaust gas.

In this embodiment, it may be understood that the exterior air is primarily heated through heat exchange with the recirculating exhaust gas, and the fuel is secondarily heated through heat exchange with the heated exterior air.

In the above-described and illustrated embodiment of the present disclosure, an example of the fuel being indirectly heated by the recirculating exhaust gas via a medium of the exterior air is described, but according to another embodiment of the present disclosure, the fuel may be directly heated by the exhaust gas.

According to an embodiment of the present disclosure, the heat exchanger 140 may include a housing member 142 that is configured such that the exterior air enters and exits, a first heat exchange part 144 that is provided in the housing member 142 to exchange heat with the recirculation line 120 and heats the exterior air introduced into the housing member 142 by a medium of the exhaust gas that circulates along the recirculation line 120, and a second heat exchange part 146 that is provided in the housing member 142 to exchange heat with the fuel supply line 130 and heats the fuel supplied along the fuel supply line 130 by a medium of the exterior air that passes via the first heat exchange part 144.

As an example, the housing member 142 may be formed in a substantially rectangular box shape. An introduction port (not illustrated), through which the exterior air is introduced, may be provided on a lower side surface of the housing member 142, and a discharge port (not illustrated), through the heat-exchanged exterior air is discharged to the outside, may be provided at an upper end of the housing member 142.

The first heat exchange part 144 is provided in the housing member 142 to exchange heat with the recirculation line 120, and is configured to heat the exterior air introduced into the housing member 142 by a medium of the exhaust gas that recirculates along the recirculation line 120.

The first heat exchange part 144 may be provided in various structures that may mutually exchange heat the high-temperature exhaust gas that flows along the recirculation line 120, and the exterior air; the present disclosure is neither limited nor restricted by the type and structure of the first heat exchange part 144.

As an example, the first heat exchange part 144 may include a first heat exchange body (not illustrated), and a first heat exchange pin (not illustrated) that is provided on an outer surface of the heat exchange body, and the recirculation line 120 may be disposed to pass through an interior of the first heat exchange body.

According to an embodiment, a fan (not illustrated) may be provided within the housing member 142. The exterior air introduced into the housing member 142 may be forced to flow upward through the heat exchange pins by the fan, and the exterior air may be heated while passing through the heat exchange pins.

The second heat exchange part 146 is provided in the housing member 142 to exchange heat with the fuel supply line 130. It is configured to heat the fuel supplied along the fuel supply line 130 using the exterior air that has passed through the first heat exchange part 144 as the heat transfer medium.

The second heat exchange part 146 may be provided in various structures that may heat the fuel supplied along the fuel supply line 130 by a medium of the high-temperature exterior air that has passed via the first heat exchange part 144, and the present disclosure is neither limited nor restricted by the type and structure of the second heat exchange part 146.

As an example, the second heat exchange part 146 may include a second heat exchange body (not illustrated) that is exposed to the high-temperature exterior air that has passed via the first heat exchange part 144, and the fuel supply line 130 may be disposed to pass through an interior of the second heat exchange body.

According to an embodiment, the housing member 142 may be configured to contain at least a portion of the two lines, the recirculation line 120 in which the recirculating exhaust gas flows and the fuel supply line 130 in which the fuel to be supplied to the combustor flows. The exterior air introduced into the housing member 142 is first heated by heat exchange with the recirculation line 120 in the first heat exchange part 144, then heats the fuel flowing in the fuel supply line 1310 by heat exchange in the second heat exchange part 146, and then is discharged from the housing member 142.

According to a preferred embodiment of the present disclosure, the gas turbine system may include a mixing chamber 148 that is provided between the first heat exchange part 144 and the second heat exchange part 146 and mixes the exterior air that has passed via the first heat exchange part 144, and the second heat exchange part 146 may heat the fuel by a medium of the exterior air that has passed via the mixing chamber 148.

Preferably, a control valve (not illustrated) for controlling flow of the exterior air (the high-temperature exterior air) introduced from the first heat exchange part 144 to the mixing chamber 148 (e.g., for adjusting an amount of the supplied air introduced from the first heat exchange part to the mixing chamber) may be provided between the first heat exchange part 144 and the mixing chamber 148.

In this way, in an embodiment of the present disclosure, because a heat exchange deviation between the second heat exchange part 146 and an exterior air may be minimized by providing the mixing chamber 148 between the first heat exchange part 144 and the second heat exchange part 146. The high-temperature exterior air, which has passed through the first heat exchange part 144, is mixed in the mixing chamber 148, to achieve a uniform temperature and a uniform flow velocity before being exposed to (heat-exchanged with) the second heat exchange part 146. As a result, the fuel that has passed through the second heat exchange part 146 may be heated to a more uniform temperature.

By the structure, the exterior air introduced into the housing member 142 may be heated while passing through the first heat exchange part 144, and may be discharged to the outside through the discharge port of the housing member 142 after exchanging heat with the second heat exchange part 146 (heating the second exchange part) by a medium of the mixing chamber 148.

Referring to FIG. 2, the fuel that flows in and along the fuel supply line 130 may be supplied to the combustor 40 after being heated while passing through the second heat exchange part 146. Referring to FIG. 3, the exhaust gas extracted from the exhaust gas guide duct 110 to the recirculation line 120 may circulate back into an interior of the exhaust gas guide duct 110 along the recirculation line 120, after passing through the first heat exchange part 144.

According to a preferred embodiment of the present disclosure, the exhaust gas that recirculates to the exhaust gas guide duct 110 via the first heat exchange part 144 (the exhaust gas introduced into the exhaust gas guide duct through the outlet part of the circulation line) may be defined as having a temperature that is lower than that of the exhaust gas introduced from the exhaust gas guide duct 110 to the recirculation line 120 (the exhaust gas introduced into an inlet of the circulation line).

A temperature of the exhaust gas that has passed via the first heat exchange part 144 may be variously set according to required conditions and design specifications. Preferably, the exhaust gas that has passed via the first heat exchange part 144 (the exhaust gas introduced into the exhaust gas guide duct through the outlet part of the circulation line) may be defined as having a temperature of approximately 200° C. to 250° C.

In this way, in an embodiment of the present disclosure, because the temperature of the exhaust gas discharged to the outside through the exhaust gas guide duct 110 may be lowered further by circulating the cooled exhaust gas to the exhaust gas guide duct 110 via the first heat exchange part 144 again, the exhaust gas system and the environment facility may be managed more efficiently.

Furthermore, a temperature of the exterior air that has passed via the first heat exchange part 144 may be variously set according to required conditions and design specifications. Preferably, the exterior air that has passed via the first heat exchange part 144 may be defined as having a temperature of approximately 250° C. to 400° C.

Meanwhile, a temperature of the fuel that has passed via the first heat exchange part 144 may be variously set according to required conditions and design specifications. Preferably, the fuel that has passed via the first heat exchange part 144 may be defined as having a temperature of approximately 200° C. to 350° C.

According to a preferred embodiment of the present disclosure, the gas turbine system may include a first control valve 122 that is provided in the recirculation line 120 and controls flow of the exhaust gas that flows from the exhaust gas guide duct 110 to the recirculation line 120.

As an example, the first control valve 122 may be provided between the inlet part of the recirculation line 120 and the heat exchanger 140.

Various valves that may control the flow of the exhaust gas that flows from the exhaust gas guide duct 110 to the recirculation line 120 may be used as the first control valve 122, and the present disclosure is neither limited nor restricted by the type and characteristics of the first control valve 122.

Here, an aspect that the flow of the exhaust gas that flows from the exhaust gas guide duct 110 to the recirculation line 120 is controlled is defined as including both of switching on and off the flow of the exhaust gas that flows from the exhaust gas guide duct 110 to the recirculation line 120 and selectively controlling a flow rate of the exhaust gas that flows from the exhaust gas guide duct 110 to the recirculation line 120.

According to a preferred embodiment of the present disclosure, the gas turbine system may include a second control valve 124 that is provided in the recirculation line 120 and controls flow of the exhaust gas that flows from the heat exchanger 140 to the exhaust gas guide duct 110.

As an example, the second control valve 124 may be provided between the heat exchanger 140 and the outlet part of the recirculation line 120.

Various valves that may control the flow of the exhaust gas that flows from the heat exchanger 140 to the exhaust gas guide duct 110 may be used as the second control valve 124, and the present disclosure is neither limited nor restricted by the type and characteristics of the second control valve 124.

Here, an aspect that the flow of the exhaust gas that flows from the heat exchanger 140 to the exhaust gas guide duct 110 is controlled is defined as including both of switching on and off the flow of the exhaust gas that flows from the heat exchanger 140 to the exhaust gas guide duct 110 and selectively controlling a flow rate and a pressure of the exhaust gas that flows from the heat exchanger 140 to the exhaust gas guide duct 110.

As an example, the first control valve 122 and the second control valve 124 may open the recirculation line 120 when it is necessary to heat the fuel during an operation of the gas turbine 20. On the other hand, when it is unnecessary to heat the fuel during an operation of the gas turbine 20 or the operation of the gas turbine 20 is stopped, the first control valve 122 and the second control valve 124 may be configured to block the recirculation line 120.

According to a preferred embodiment of the present disclosure, the gas turbine system may include an ejection nozzle 126 that is connected to the outlet end of the recirculation line 120 to eject the exhaust gas (the exhaust gas that has passed via the first heat exchange part) in an interior of the exhaust gas guide duct 110.

A general nozzle that may eject the exhaust gas may be used as the ejection nozzle 126, and the present disclosure is neither limited nor restricted by the kind and structure of the ejection nozzle 126.

As an example, a plurality of ejection nozzles 126 may be provided at the outlet end of the recirculation line 120 to be spaced apart from each other by a specific interval. The plurality of ejection nozzles 126 may be distributed across the interior of the exhaust gas guide duct 110 to uniformly eject the exhaust gas returning via the recirculation line 120 throughout the interior of the exhaust gas guide duct 110.

In this way, in an embodiment of the present disclosure, the high-temperature exhaust gas and the low-temperature exhaust gas (the exhaust gas cooled via the first heat exchange part 144) may be mixed more uniformly by providing the ejection nozzle 126 at the outlet end of the recirculation line 120 and ejecting the exhaust gas (the cooled exhaust gas) that has passed via the first heat exchange part 144 into an interior of the exhaust gas guide duct 110.

According to a preferred embodiment of the present disclosure, the fuel supply line 130 may include a first supply line 132 that is connected to a fuel supplier (not illustrated) at one end and to the combustor 40 at the other end without passing through the heat exchanger 40, and a second supply line 134, one end of which is connected to the first supply line and an opposite end of which is connected to the first supply line after passing through the heat exchanger 140. That is, the first supply line 132 does not pass through (i.e., does bypass) the heat exchanger 140, while the second supply line 134 branches from the first supply line 132, extends through the heat exchanger 140 and then merges back to the first supply line 132.

The fuel may flow along the first supply line, and a portion of the fuel that requires heating may branch and flow along the second supply line. For example, the fuel that flows along the second supply line may be heated to approximately 300° C. to 350° C. while passing via the second heat exchange part 146.

According to a preferred embodiment of the present disclosure, the gas turbine system may include a third control valve 136 that is provided in the first supply line, at a position to which one end of the second supply line is connected, and the third control valve 136 may switch flow of the fuel such that at least a portion of the fuel selectively passes via the second supply line.

Various valves that may selectively switch a flow path of the fuel to the first supply line or the second supply line may be used as the third control valve 136, and the present disclosure is neither limited nor restricted by the type and structure of the third control valve 136.

As an example, a general 3-way valve may be used as the third control valve 136. In detail, the third control valve 136 may include a first port (not illustrated) as an inlet, to which the fuel is supplied from the fuel supplier, a second port (not illustrated) as an outlet, to which a first supply line 132 is connected, and a third port (not illustrated) as another outlet, to which a second supply line 134 is connected.

By opening and closing the second port or the third port, the flow path of the fuel may be switched to the first supply line or the second supply line. For example, when the second port is opened and the third port is blocked, the fuel that is introduced through the first port may be supplied to the combustor 40 only along the first supply line 132. On the other hand, when the third port is opened and the second port is blocked, the fuel that is introduced through the first port may be supplied to the combustor 40 after being heated along the second supply line 134. Unlike this, it is possible to simultaneously open the second port and the third port and adjust opening degrees of the second port and the third port according to an operation state (or the temperature of the fuel) of the gas turbine 20.

According to a preferred embodiment of the present disclosure, the gas turbine system may include an orifice 138 that is provided in the first supply line and adjusts the flow rate of the fuel that flows along the first supply line.

Various orifices 138 that may adjust the flow rate of the fuel that flows along the first supply line may be used as the orifice 138, and the present disclosure is neither limited nor restricted by the type and structure of the orifice 138.

As an example, when it is necessary to change an operation state of the gas turbine 20 due to a malfunction or a failure of the fuel heating system, the gas turbine 20 may be configured to maintain a minimum operation state by opening the second port of the third control valve 136 and blocking the third port and thus, allowing the entire fuel supplied to the fuel supply line 130 to pass via the orifice 138 along the first supply line 132.

Meanwhile, if the fuel leaks due to damage (breakdown) in the second heat exchanger part 146, the leaked fuel is discharged to the outside along with the exterior air that flows upward by the fan (not illustrated) provided in the housing member 142. As a result, the risk associated with the fuel leakage may be reduced, enabling stable operation.

As described above, according to the present disclosure, the combustion characteristics of the fuel may be improved and the output and the performance may be improved.

In particular, according to the present disclosure, the fuel supplied to the combustor may be heated to an appropriate temperature that is suitable for combustion by using the exhaust gas exhausted from the gas turbine while not extracting air of a high temperature and a high pressure at a rear end of the compressor or not using a separate heating device.

Most of all, according to the present disclosure, the temperature of the exhaust gas may be lowered while improving the combustion characteristics of the fuel by using the exhaust gas exhausted by the gas turbine.

In addition, according to the present disclosure, the structure may be simplified, and the degree of freedom of design and the space utility may be improved.

Furthermore, according to the present disclosure, cost may be saved, and the stability and the reliability may be improved.

Also, by using exterior air as an intermediate medium for the heat exchange in the heat exchanger 140, safer, more precise, and more uniform control of fuel heating becomes possible.

Although the embodiments have been mainly described above, they are simply examples and are not intended to limit the present disclosure, and it may be understood by those skilled in the art, to which the present disclosure pertains, that various modifications and applications that have not been described above may be possible while departing from essential characteristics of the embodiment. For example, the components that appear in detail in the embodiment may be carried out after being modified. Furthermore, it should be construed that the differences related to the modifications and applications are included in the scope of the present disclosure, which is defined in the attached claims.

What is claimed is:

1. A gas turbine system comprising:
- an exhaust gas guide duct provided on a downstream side of a gas turbine, and configured to guide exhaust gas discharged from the gas turbine to an outside;
- a recirculation line connected to the exhaust gas guide duct, and configured to recirculate the exhaust gas extracted from the exhaust gas guide duct back into the exhaust gas guide duct;
- a fuel supply line configured to supply a fuel to a combustor of the gas turbine; and
- a heat exchanger configured to heat the fuel using the exhaust gas recirculating along the recirculation line,
- wherein the heat exchanger heats the fuel by an intermediate medium of ambient air heated by the exhaust gas, and
- wherein the heat exchanger includes:
- a housing member configured such that the ambient air enters and exits;
- a first heat exchange part provided in the housing member, through which the recirculation line passes, and configured to heat the ambient air introduced into the housing member by heat exchange with the exhaust gas recirculating along the recirculation line; and
- a second heat exchange part provided in the housing member and on an upper side of the first heat exchange part, through which the fuel supply line passes, and configured to heat the fuel supplied along the fuel supply line by heat exchange with the ambient air having passed through the first heat exchange part.

2. The gas turbine system of claim 1, comprising:
- a mixing chamber provided between the first heat exchange part and the second heat exchange part, and configured to mix the ambient air having passed through the first heat exchange part,
- wherein the second heat exchange part heats the fuel using the ambient air having passed via the mixing chamber.

3. The gas turbine system of claim 1, wherein the exhaust gas recirculating to the exhaust gas guide duct via the first heat exchange part is defined as having a lower temperature than that of the exhaust gas introduced from the exhaust gas guide duct to the recirculation line.

4. The gas turbine system of claim 1, wherein the exhaust gas having passed via the first heat exchange part is defined as having a temperature of 200° C. to 250° C.

5. The gas turbine system of claim 1, wherein the ambient air having passed via the first heat exchange part is defined as having a temperature of 250° C. to 400° C.

6. The gas turbine system of claim 1, wherein the fuel having passed via the second heat exchange part is defined as having a temperature of 300° C. to 350° C.

7. The gas turbine system of claim 1, comprising:
- a first control valve provided in the recirculation line, and configured to control flow of the exhaust gas moving from the exhaust gas guide duct to the heat exchanger.

8. The gas turbine system of claim 1, comprising:
- a second control valve provided in the recirculation line, and configured to control flow of the exhaust gas moving from the heat exchanger to the exhaust gas guide duct.

9. The gas turbine system of claim 1, wherein an inlet end of the recirculation line is connected to the exhaust gas guide duct, and an outlet end of the recirculation line is connected to an upstream side of the exhaust gas guide duct than the inlet end.

10. The gas turbine system of claim 1, comprising:
- an ejection nozzle connected to an outlet end of the recirculation line, and configured to eject the exhaust gas to an interior of the exhaust gas guide duct.

11. The gas turbine system of claim 1, wherein the fuel supply line includes:
- a first supply line connected to the combustor; and
- a second supply line, which branches from the first supply line, extends through the heat exchanger, and then merges back to the first supply line.

12. The gas turbine system of claim 11, comprising:
- a third control valve provided in the first supply line at a position where the second supply line branches,
- wherein the third control valve switches flow of the fuel such that at least a portion of the fuel selectively passes via the second supply line.

13. The gas turbine system of claim 11, comprising:
- an orifice provided in the first supply line at a portion bypassing the heat exchanger, and configured to adjust a flow rate of the fuel moving along the first supply line.

14. The gas turbine system of claim 1, comprising:
- an exhaust gas processing part provided on an upstream side of the exhaust gas guide duct, and configured to process the exhaust gas,
- wherein the recirculation line is connected to the exhaust gas guide duct on a downstream side of the exhaust gas processing part.

15. A gas turbine system comprising:
- a gas turbine including a combustor configured to burn a fuel with air to generate exhaust gas;
- a fuel supply line configured to supply the fuel to the combustor;
- an exhaust gas guide duct provided on a downstream side of the gas turbine, and configured to guide exhaust gas discharged from the gas turbine to an outside;
- a recirculation line connected to the exhaust gas guide duct, and configured to recirculate the exhaust gas extracted from the exhaust gas guide duct back into the exhaust gas guide duct; and
- a heat exchanger configured to heat the fuel using the exhaust gas recirculating along the recirculation line,
- wherein the heat exchanger heats the fuel by an intermediate medium of ambient air heated by the exhaust gas, and
- wherein the heat exchanger includes:
- a housing member configured such that the ambient air enters and exits;

a first heat exchange part provided in the housing member, through which the recirculation line passes, and configured to heat the ambient air introduced into the housing member by heat exchange with the exhaust gas recirculating along the recirculation line; and a second heat exchange part provided in the housing member and on an upper side of the first heat exchange part, through which the fuel supply line passes, and configured to heat the fuel supplied along the fuel supply line by heat exchange with the ambient air having passed through the first heat exchange part.

* * * * *